March 8, 1960  M. H. MORRIS  2,927,765
VALVE STRUCTURE
Filed April 9, 1956
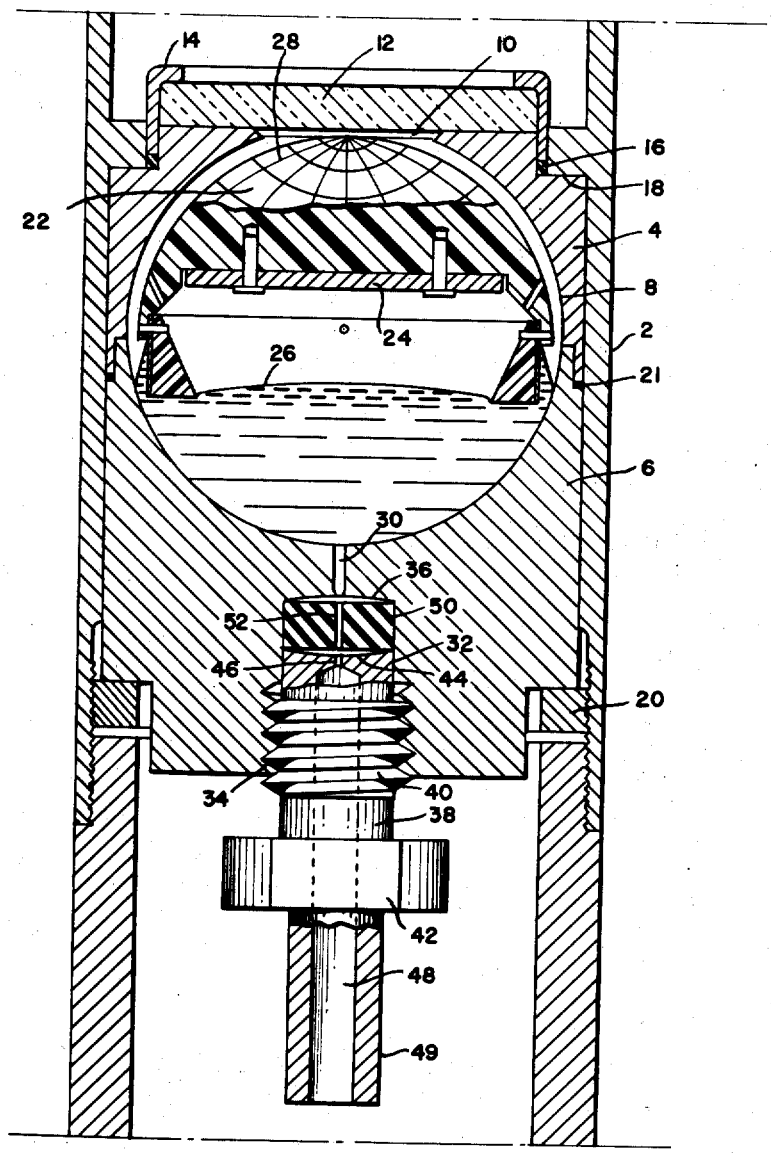
INVENTOR.
MARION H. MORRIS
BY
ATTORNEYS

United States Patent Office 2,927,765
Patented Mar. 8, 1960

2,927,765

VALVE STRUCTURE

Marion H. Morris, Mountain View, Calif., assignor to Sperry-Sun Well Surveying Company, Philadelphia, Pa., a corporation of Delaware Application April 9, 1956, Serial No. 577,165

2 Claims. (Cl. 251—4)

This invention relates to valve structures particularly designed for use in a line through which evacuation of a container is effected. The valve has particular utility in the evacuation of a chamber in which a float is supported on a pool of mercury, but the valve, per se, is of more general utility.

In the application of Samuel H. Williston and myself, Serial No. 551,024, filed December 5, 1955, there is disclosed a well surveying instrument structure in which a float carrying a magnet and provided with inclination indicating markings is floated upon a pool of mercury enclosed within a housing which, in said application, is formed of glass. As brought out in said application, the attainment of high sensitivity of mounting of such a float is attended with difficulties largely having to do with the maintenance of purity of mercury. In particular, mercury is susceptible to ready oxidation and to surface contamination by various gases and it has been found that best results are secured if the chamber is evacuated with the residual gas consisting only of pure nitrogen.

In said application the disclosure involves the use of a capillary glass tube through which evacuation takes place, the tube being arranged to be sealed off with a torch following evacuation.

It has been found that still better results are attained if the float chamber is constructed of titanium. In view of the use of this metal evacuating and sealing means in the form of a glass capillary tube is not practical and one of the objects of the present invention is the provision of a valve suitable for the evacuation and sealing of a chamber formed in a metallic container such as the titanium container just mentioned.

A further object of the invention relates to the provision of a valve which is very readily manipulated for sealing purposes but which may also be readily opened in the event that the chamber should be emptied and refilled, followed by evacuation.

While the valve has the particular use just described, it is of more general applicability particularly to vessels which are to be evacuated or, alternatively, to be closed against high interior pressures.

The foregoing and other objects of the invention, particularly relating to details of construction will become apparent from the following description, read in conjunction with the accompanying drawing in which the figure is a vertical section showing the improved valve in association with an inclination indicating means for a well surveying instrument.

For the well surveying instrument in general reference may be made to said prior application of Williston and myself and also to the patent to Young, No. 2,616,187, dated November 4, 1952. Only so much of the well surveying instrument is shown in the drawing as is necessary for an understanding of the present invention. The other elements not shown herein involve timing means for controlling the time at which one or more photographic exposures may be made, illumination means, and devices for photographing the marked surface of a spherical or other member to give a record from which direction and inclination may be determined.

The inner casing of a well surveying instrument embodying the other elements mentioned is shown at 2, this casing being receivable within a conventional protective casing sufficiently strong to withstand the high pressures encountered in bore hole surveying. A pair of housing members 4 and 6 are interfitted to provide a spherical cavity 8, which cavity at its upper end is closed by a glass disc 12 held in position by a ring 14 cemented at 16 and providing a light-transmitting opening at 10. The housing members 4 and 6 are cemented together at 21 and are held in the casing by being pressed against a shoulder 18 by means of a threaded ring 20.

Within the spherical cavity there is located a float 22 carrying a magnet 24 and supported on a pool of mercury 26, the float carrying markings 28 which may be photographed by a camera located above the assembly which is shown, the markings 28 being photographed relative to an index marking which may be provided on the underside of the disc 12.

The aspects of support of the float 22 in a stable center position form no part of the present invention and reference may be made to said proir joint application for details of what is involved.

The assembly so far described is essentially that disclosed in said joint application with the exception that it has been found advantageous to form the housing members 4 and 6 of titanium which prevents contamination of the mercury and is so non-magnetic as not to provide any appreciable error in the position assumed by the compass 24 under the action of an external field, it being understood that the other adjacent elements are of non-magnetic materials. The fact that the housing element 6 is of a metal, preferably titanium, raises some difficulties in the securing of proper evacuation and sealing since expansion and contraction with variations of temperature would lead to the possible freeing or other disturbances of a glass capillary cemented in position. In accordance with the present invention the following arrangement is provided for evacuation and sealing:

A small bore 30 provides communication between the spherical chamber 8 and an enlarged bore 32 in the housing member 6 which bore 32 is, at its outer end, threaded at 34. The inner end of the enlarged bore surrounding the area of communication with the bore 30 is desirably smoothly dished as indicated at 36 so as to be concave downwardly.

Threaded into the threads 34 is a valve closing member 38 provided with threads 40 and with a flattened collar portion 42 by which a wrench may be applied for turning action. The upper end of the member 38 is provided with a small bore 46 which furnishes communication between the region above the member 38 and an enlarged bore 48 which opens through a stem portion 49 of the member 38. The upper end of the member 38 is slightly dished as indicated at 44 so as to be concave upwardly.

Located in the space between the surfaces 36 and 44 is a valve element 50 in the form of a cylinder of rubber, preferably silicone rubber and provided with an axially extending bore 52. The valve element or washer 50 desirably has a rather tight fit in the bore or cavity 32, the relative diameters of the valve element and the wall of the cavity being such that the bore 52 is somewhat reduced in diameter in the assembly even when pressure is not applied through the member 38. The small bore 52 may originally have a diameter of the order of a fraction of a millimeter and the bores 30 and 46 are of comparable sizes with the result that when the valve is open free communication is afforded between the upper end of the bore 30 and the lower end of the bore 46 with the result that gas may be evacuated from the chamber 8 when the apparatus is in inverted position and a pump is connected to the stem 49 of member 38. When evacuation is completed the member 38 is caused to move inwardly to apply pressure to the valve member 50. In a typical arrangement this involves only a small fraction of a turn of the member 38 through the action of a wrench, there being some exaggeration indicated in the figure in the amount of dishing existing at 36 and 44.

Inasmuch as rubber is substantially volumetrically incompressible, the compressibility being only of the order of that of water, the tightening of the stem 38 will distort the member 50 in such fashion as to secure extremely tight closure of the opening 52, this closure being aided by the dished forms of the surfaces at 36 and 44. It has been found that the closure thus afforded is extremely tight and will serve to maintain a very high vacuum in the chamber 8 which is essentially permanent. On the other hand, the valve may be readily opened merely by turning the member 38 for its retraction whereupon the element 50 returns to its original shape providing an opening at 52.

The member 38 may also be formed of titanium so as to provide against any contamination of the mercury as well as to provide against magnetic material in the vicinity of the magnet 24.

While the valve has been shown in a particular use it will be evident that it is applicable for many other purposes both for the maintenance of high vacuum or for the maintenance of high pressure conditions within a chamber. The bores 30 and 36 are made sufficiently small so that even under extreme pressures only negligible extrusion of the rubber may occur into these openings.

Various changes in details of construction may be made without departing from the invention as defined in the following claims.

What is claimed is:

1. In a body having formed therein a chamber adapted for being evacuated, a valve structure for sealing a passage extending through a wall of said chamber, said passage including an inner section in the form of a small diameter bore communicating with the interior of said chamber, and an outer section in the form of a comparatively large diameter bore section coaxial with and extending in longitudinal continuation of said small diameter bore section, there being an annular shoulder extending cross-axially of said large diameter bore section and about said small diameter bore at the junction of said small and large diameter bore sections, a valve closing member threaded into the outer end of said large diameter bore, and a valve in the form of a deformable disc fitted tightly into said large diameter bore, inwardly of said member, with the inner face of the disc disposed in paired opposed relation to the face of said annular shoulder, and with the outer face of said disc disposed in paired opposed relation to the inner terminal face of said member, one face of each pair thereof being a concave surface presenting toward the other, said concave surfaces presenting in opposite directions, said disc being provided with a central aperture of a diameter approximating that of said small diameter bore, said member being provided with an axially extending through passage communicating with the interior of said chamber through said valve aperture and said small diameter bore, at least the inner end portion of said axially extending passage being coaxial with and of a diameter approximating that of said valve aperture, said valve closing member being operable during the operation of evacuating said chamber through said axially extending passage for axially applying a compressive force for deforming said valve thereby to close the valve aperture and seal said chamber.

2. In a body having formed therein a chamber adapted for being evacuated, a valve structure for sealing a passage extending through a wall of said chamber, said passage including an inner section in the form of a small diameter bore communicating with the interior of said chamber, and an outer section in the form of a comparatively large diameter bore section coaxial with and extending in longitudinal continuation of said small diameter bore section, there being an annular shoulder extending cross-axially of said large diameter bore section and about said small diameter bore at the junction of said small and large diameter bore sections, a valve in the form of a plain flat rubber disc fitted tightly into said large diameter bore and disposed proximate said annular shoulder, said disc being provided with a central aperture of a diameter approximating that of said small diameter bore, and a valve closing member threaded into the outer end of said large diameter bore section, said member being provided with an axially extending through passage communicating with the interior of said chamber through said valve aperture and said small diameter bore, at least the inner end portion of said axially extending passage being coaxial with and of a diameter approximating that of said valve aperture, said annular shoulder and the inner terminal portion of said valve closing member presenting cross-axially extending concave surfaces respectively to the oppositely facing flat surfaces of the valve disc, said valve closing member being operable during the operation of evacuating said chamber through said axially extending passage for axially applying a compressive force for deforming said valve thereby to close the valve aperture and seal said chamber.

References Cited in the file of this patent

UNITED STATES PATENTS

| | | |
|---|---|---|
| 1,657,663 | Devereux | Jan. 31, 1928 |
| 1,912,358 | Bush | June 6, 1933 |
| 2,246,519 | Jones | June 24, 1941 |
| 2,442,746 | Anderson et al. | June 8, 1948 |
| 2,464,917 | Babson | Mar. 22, 1949 |
| 2,664,095 | Magni | Dec. 29, 1953 |

FOREIGN PATENTS

| | | |
|---|---|---|
| 222,794 | Great Britain | Oct. 9, 1924 |

OTHER REFERENCES

Irish, E. M., and Stiraat, J. R.: "Silicone Rubber," Product Engineering Magazine, pp. 146–150, February 1947, McGraw-Hill Publ. Co., New York, N.Y. (251–368).

Irvin, N. M., and Russell, A. S.: "Solubility, Etc." Chemical Society Journal (London), Pt. 1, Jan.–June (1932), pp. 891–897. (Copy in Scientific Library.)